United States Patent [19]

Lazzari

[11] Patent Number: 4,953,424
[45] Date of Patent: Sep. 4, 1990

[54] DEVICE FOR COMMUNICATING BETWEEN TWO MEDIA SEPARATED BY A SLOTTED WALL

[75] Inventor: Jean-Pierre Lazzari, Corenc, France

[73] Assignee: Commissariat a l'Energie Atomique, Paris, France

[21] Appl. No.: 313,715

[22] Filed: Feb. 22, 1989

[30] Foreign Application Priority Data

Mar. 2, 1988 [FR] France .................. 88 02636

[51] Int. Cl.$^5$ .................. G05G 1/00; A44B 21/00
[52] U.S. Cl. .................. 74/566; 24/303; 180/90.6
[58] Field of Search .................. 74/566, 606 R, 606 A, 74/608, 609, 565; 24/303, 385; 55/385 A; 98/36, 37; 414/8; 180/90.6

[56] References Cited

U.S. PATENT DOCUMENTS

| 2,373,455 | 4/1945 | Carey .................. 74/566 X |
| 2,627,097 | 2/1953 | Ellis .................. 24/201 |
| 2,809,411 | 10/1957 | Markoff-Mogadham .................. 24/203 |
| 3,285,093 | 11/1966 | Sellmeyer .................. 74/566 |
| 3,428,272 | 2/1969 | Feder .................. 244/63 |
| 3,748,923 | 7/1973 | Babbitt et al. .................. 74/566 |
| 4,351,199 | 9/1982 | Mozingo .................. 180/90.6 X |
| 4,505,324 | 3/1985 | Hildebrand et al. .................. 74/566 X |
| 4,793,620 | 12/1988 | Karch .................. 74/566 X |

FOREIGN PATENT DOCUMENTS 2226888 11/1974 France .
55-159216 12/1980 Japan .................. 74/566

*Primary Examiner*—Vinh T. Luong
*Attorney, Agent, or Firm*—Pearne, Gordon, McCoy & Granger

[57] ABSTRACT

Device for communication between two media (2, 3) separated by a slotted wall (1). On the slot (4) is placed a packing with lips (13, 14), the edge (15, 16) of which is covered with magnets (17, 18) having an attracting action. Arm (5) passing through the slot (4) is provided with magnets (21, 22), which locally move the lips (13, 14) apart. This prevents friction and deformations.

4 Claims, 2 Drawing Sheets

DEVICE FOR COMMUNICATING BETWEEN TWO MEDIA SEPARATED BY A SLOTTED WALL

BACKGROUND OF THE INVENTION

The present invention relates to a device for communicating between two media separated by a slotted wall through which passes a gripping or remote manipulation arm.

The automatic manipulation and displacement of objects in ultra-clean enclosures, particularly in the semiconductor industry, makes it necessary to place outside of the enclosures the movement transmission mechanisms and motors, which raise a lot of dust as a result of their vibrations. Therefore they are placed behind a wall defining the ultra-clean enclosure. A slot is made in the wall for the passage of an arm.

In the case of an arm subject to translations perpendicular to its axis, the slot is elongated, which causes serious sealing problems. Although it is necessary to maintain a high pressure condition in the ultra-clean enclosure in order to produce an air current to the outside and thus constitute an obstacle to the impurities and dust, the communication surface must not be excessive because ventilation then becomes costly.

A frequently used solution consists of joining the contours of the slot and the arm by deformable membrane or diaphragm. However, this still leads to dust appearing as a result of displacements of said membrane, while causing mechanical limitations to the movements of the arm and, in the long term, wear due to membrane fatigue.

French patent 2 226 888 describes a membrane formed by two contiguous lips for covering a slot. The edges or borders of the lips are joined by mortise and tenon sections which can be fitted into one another, or by means of magnets having opposite polarity. A slider slides between the edges and locally separates them, while squeezing them in the slides. Thus, it is in fact a double Eclair closure, more commonly called a zipper. This device cannot be used in the technical field of the invention, because it involves significant mechanical contacts giving rise to dust.

SUMMARY OF THE INVENTION

The invention therefore relates to a device essentially closing the slot and only opening it locally at the location where the arm is and namely without any contact with the latter, while the device is only subject to limited deformations.

This objective is achieved with the aid of a packing or sealing joint, which covers the slot and which is constituted by two lips fixed to the slot wall. Each of these lips has an edge or bonder equipped with magnets, the edges facing one another and the magnets exerting an attracting action to join the edges and close the slot. Characteristically, the arm is also provided with magnets, but moves the magnets away from the lips in order to locally separate the latter. Any mechanical contact between the lips and the arm is consequently prevented and, in addition, the limited opening formed constitutes an excellent exit port for the air under pressure from the ultra-clean enclosure.

Advantageously the arm has an oblong section and its greatest extension is parallel to the lips, so that they are less deformed on being separated.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENT

Figure 1:
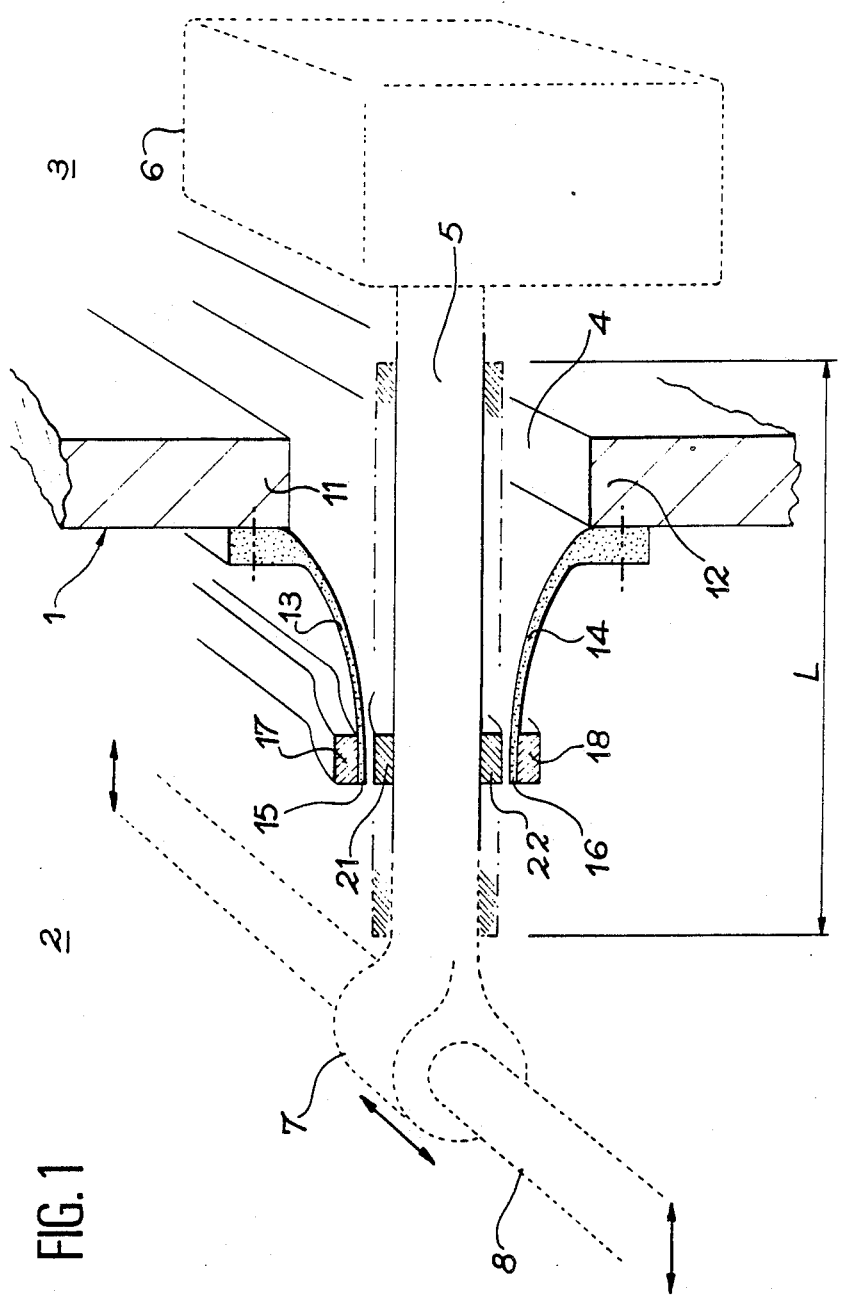
FIG. 1 A part sectional view of the invention according to the line I-I in FIG. 2.

In FIG. 1, a wall 1 separates two enclosures or volumes, namely a non-clean enclosure 2 and an ultra-clean enclosure 3. Wall 1 is provided with a slot 4 through which passes an arm 5, which consequently extends into both the enclosures 2 and 3. Arm 5 is terminated in the ultra-clean enclosure 3 by a gripper 6 or any similar object enabling it to seize or displace objects present in the ultra-clean enclosure 3. The other end 7 of arm 5 slides on a slide 8 parallel to slot 4.

Figure 2:
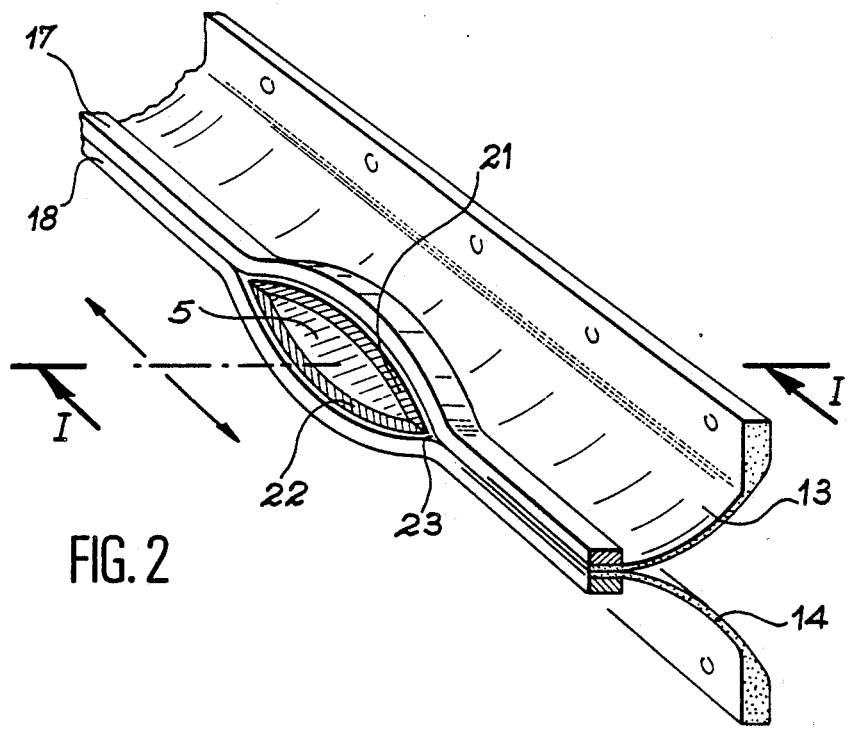
FIG. 2 A view of the invention in which the wall and the slot are seen from the front.

The upper contour 11 and lower contour 12 of slot 4 are in each case provided with a flexible lip made from a metal strip or a plastic sheet designated 13 in the case of the upper lip and 14 in the case of the lower lip, whereby each is provided with a border or edge 15 or 16 parallel to slot 4. Each edge 15 or 16 is provided with magnets 17 or 18, the magnet 17 of the upper lip 13 attracting the magnets 18 of the lower lip 14. Therefore the normal condition of lips 13 and 14 is the closing of slot 4 through contact between edges 15 and 16, as can be seen in FIG. 2.

Arm 5 passes between lips 13 and 14 and consequently locally separates them. It is provided with magnets 21, 22 on its upper and lower outer surfaces. Magnets 21 on its upper surface force magnets 17 away from the upper lip 13 and magnets 22 on its lower surface force away the magnets 18 from the lower lip 14. Thus, lips 13 and 14 open around arm 5, with a limited clearance 23 around the latter. When arm 5 moves on its slide 8, lips 13 and 14 progressively open on one side, whilst closing on the other. Therefore magnets 21 and 22 on arm 5 ensures that there is no contact between the latter and lips 13 and 14, which would cause friction on the latter. Clearance 23 is reduced, so that it is possible to maintain the necessary cleanness of the ultra-clean enclosure 3 solely with a reduced power blower.

Lips 13 and 14 are not extended by wall 1, but instead converge while extending into the non-clean enclosure 2, perpendicular to wall 1, which limits the deformations of lips 13 and 14 when arm 5 moves them apart.

The arm 5 preferably has an oblong section with its greatest length parallel to lips 13 and 14. This also contributes to limiting the deformations of lips 13 and 14 during the passage of arm 5.

Figure 3:
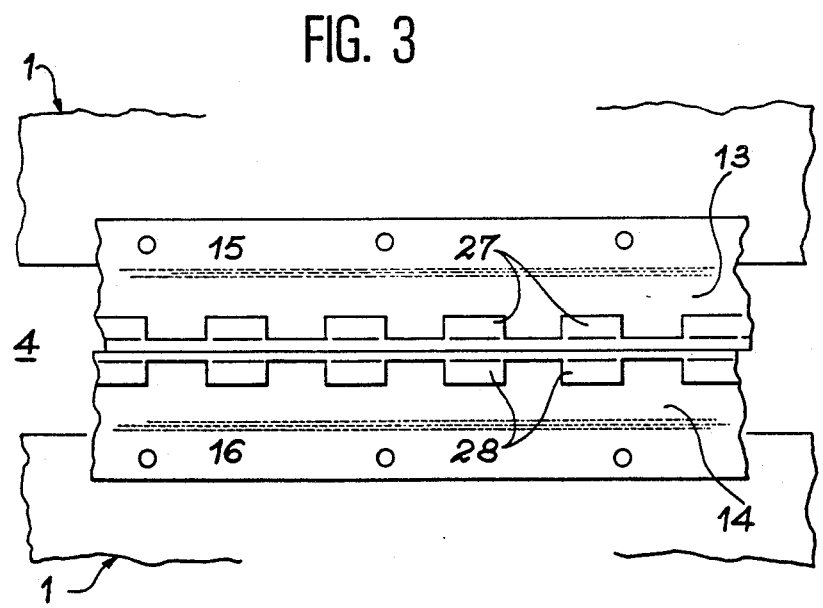
FIG. 3 Another realization of the invention.

The hitherto represented magnets 17 and 18 are flexible continuous strips. However, it is possible to replace these flexible strips by discontinuous magnetized blocks 27 on upper edge 15 and 28 on lower edge 16. This is shown in FIG. 3. Magnets 27, 28 face one another and are attracted in order to join edges 15, 16. The operation is identical to that with the continuous magnets 17, 18. Magnets 21 and 22 covering arm 5 can also be continuous or discontinuous.

Finally, the device can be adapted to axial movements of arm 5, e.g. resulting from a displacement of slide 8. It is sufficient to extend magnets 21, 22 by a length L (FIG. 1) compatible with the axial travel of arm 5.

I claim:

1. Device comprising a wall (1) separating two media (2, 3), the wall having a slot (4) through which passes an arm (5), the slot being provided with a packing constituted by two lips (13, 14) fixed to the wall and each lip having an edge (15, 16) provided with magnets (17, 18), the edges facing one another and the magnets of the edges attracting each other to join the edges together and close the slot, wherein the arm is provided with magnets (21, 22) moving away the magnets of the edges in order to locally separate the lips around the arm, a clearance (23) extending between the arm and the lips.

2. Device for communicating between two media according to claim 1, wherein arm (5) has an oblong section elongated parallel to lips (13, 14).

3. Device for communicating between two media according to claim 1, wherein the magnets of edges (15, 16) are continuous flexible strips (17, 18).

4. Device for communicating between two media according to claim 1, wherein the magnets of edges (15, 16) are discontinuous blocks (27, 28).

* * * * *